(12) United States Patent
Lagler et al.

(10) Patent No.: US 8,662,105 B2
(45) Date of Patent: Mar. 4, 2014

(54) SUCTION VALVE WITH UNLOADER

(75) Inventors: Martin Lagler, Vienna (AT); Gerhard Stiegelmar, Gols (AT)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 80 days.

(21) Appl. No.: 13/324,365

(22) Filed: Dec. 13, 2011

(65) Prior Publication Data
US 2012/0152379 A1 Jun. 21, 2012

(30) Foreign Application Priority Data

Dec. 15, 2010 (AT) ................................ A 2074/2010

(51) Int. Cl.
*F16K 15/18* (2006.01)
(52) U.S. Cl.
USPC ............ 137/516.11; 137/516.21; 137/516.23; 137/528
(58) Field of Classification Search
USPC .......... 137/516.11, 516.21, 516.23, 522, 528, 137/385, 540, 516.13, 516.17; 417/298, 417/447
See application file for complete search history.

(56) References Cited

U.S. PATENT DOCUMENTS

| 5,634,492 A | 6/1997 | Steinrück et al. |
| 7,331,767 B2 * | 2/2008 | Spiegl et al. .................... 417/53 |
| 8,500,420 B2 * | 8/2013 | Spiegl et al. .................. 417/446 |
| 2008/0149195 A1 | 6/2008 | Spiegl et al. |

FOREIGN PATENT DOCUMENTS

DE 4431512 3/1996

OTHER PUBLICATIONS

English Abstract of DE4431512.

* cited by examiner

*Primary Examiner* — Kevin Lee
*Assistant Examiner* — Macade Brown
(74) *Attorney, Agent, or Firm* — Dykema Gossett PLLC

(57) ABSTRACT

In order to prevent the unloader from rotating relative to the valve seat, it is proposed to design the anti-rotation lock for the unloader as an anti-rotation locking disk (16) on which a central recess (17) is provided which has a cross-section that is diametrically opposed and matched to the valve nut (10), wherein the anti-rotation locking disk (16) is arranged with its central recess (17) in a non-rotational manner on the valve nut (10), and the outer contour of the anti-rotation locking disk (16) has a non-circular cross-section, and a central recess (24) is provided on the unloader (20), said central recess having an inner contour diametrically opposed and matched to the outer contour, and the unloader (20) is arranged with its central recess (24) on the anti-rotation locking disk (16).

6 Claims, 3 Drawing Sheets

SUCTION VALVE WITH UNLOADER

BACKGROUND OF THE INVENTION

1. Field of the Invention

The present invention relates to a suction valve including a valve seat and a valve guard between which a valve element is arranged in a reciprocating manner, and further including an unloader having a plurality of unloader fingers which reach through passage channels in the valve seat and rest against the valve element, whereby the unloader is arranged in a rotationally locked manner with respect to the valve seat and is guided in the axial direction by means of an anti-rotation lock.

2. The Prior Art

Suction valves of compressors are often designed with unloaders. As it is well known, unloaders serve substantially to start up the compressor under no load, or to switch the compressor to an idling operation, or to control the compressor.

In order to prevent wear on the guides of the unloader, especially in case of dry-running compressors, guide strips and guide rings have been used for years in the unloader guides as shown, e.g., in EP 686 770 A2 or DE 44 31 512 A1. In addition, rotation of the unloader can be limited by using stopping blocks made of plastic. Said stopping blocks are screwed by means of screws to the valve seat, preferably radially on the inside between two adjacent unloader fingers. If an anti-rotation lock would be omitted, the unloader fingers, due to the rotation of the unloader, would rub against the webs of the through-openings at the valve seat and could cause damage to the valve and/or unloader itself due to the resulting high degree of wear. However, due to the variety of geometries of valve designs, said stopping blocks have to be custom-made for each valve, which is costly, and have to be provided and stored in small numbers. Costs caused in this manner are correspondingly high. Moreover, the stopping blocks, in particular in case of small valves, can negatively influence the flow conditions in the valve.

From EP 1 936 194 A1 (see U.S. Patent Application Publication 2008149195) an anti-rotation lock for an unloader is already known which resolves the above-mentioned disadvantages. Here, an anti-rotation locking sleeve is provided which has a non-circular cross-section which is arranged non-rotatably and concentrically on the valve seat and on which the unloader is arranged with a correspondingly shaped, diametrically opposed central section. Due to the non-circular cross-section of the anti-rotation locking sleeve, a rotation of the unloader relative to the valve seat is prevented. The anti-rotation locking sleeve assumes at the same time the guiding function of the unloader. However, the anti-rotation lock has the disadvantage that, on the one hand, the axial length of the valve is enlarged by the anti-rotation locking sleeve, which makes the use impossible, in particular in case of controlled valves or unloaders. Also, the enlarged overall length usually makes it impossible to retrofit existing valves. If retrofitting is possible due to the available installation space, it is necessary, however, to replace the entire unloader and additionally to rework the valve seat, which makes retrofitting unfeasible in many cases from a practical point of view. On the other hand, a secure and durable function of the anti-rotation lock for the unloader requires machining the valve seat, which increases the production costs for such a valve.

It is therefore the object of the present invention to provide an anti-rotation lock for an unloader of a suction valve which is compact, is constructed and manufactured in a simple manner, and allows retrofitting of existing valves in a simple manner.

SUMMARY OF THE INVENTION

This object is achieved according to the invention in that the anti-rotation lock for the unloader is designed as an anti-rotation locking disk on which a central recess with a diametrically opposed cross-section matched to the valve nut is provided, and that the anti-rotation locking disk is arranged with its central recess on the valve nut in a non-rotatable manner, and that, at the same time, the outer contour of the anti-rotation locking disk has a non-circular cross-section, and that on the unloader, a central recess is provided that has a non-circular inner contour which is diametrically opposed and matched to the outer contour, and that the unloader is arranged with its recess on the anti-rotation locking disk. With such an anti-rotation lock, a particularly compact arrangement is achieved because the anti-rotation locking disk can be designed with a small axial length. In addition, if necessary, only a portion of the unloader has to be reworked and only the cross-section of the central recess of the unloader has to be adapted here to the outer contour of the anti-rotation locking disk. For this, the unloader does not have to be replaced, but can be reused. Also, this enables a very simple retrofitting of existing valves. Furthermore, only a limited number of different anti-rotation locking disks have to be available in order to be able to use the anti-rotation lock according to the invention for many different valves. Moreover, with an anti-rotation lock according to the invention for the unloader, the flow conditions in the valve are no longer negatively influenced.

If a guide section is provided on the unloader and the unloader is guided with the guide section on a guide sleeve, the previous guide of the unloader can be maintained and an additional guide is created by the anti-rotation lock. This double guide at least reduces a reciprocating movement of the unloader, whereby the wear on the valve element (the unloader fingers and/or the valve element) can also be reduced.

If a spring is provided in the unloader which rests with one end against the anti-rotation locking disk and with the other end against a limit stop in the unloader, a protection against unscrewing of the valve nut is created. In addition, because of this, the anti-rotation lock does not have to be specifically fastened to the valve because this is done by the spring.

BRIEF DESCRIPTION OF THE DRAWINGS

The present invention is described in the following by means of schematic, non-limiting FIGS. 1 to 3, which show in each case a preferred exemplary embodiment of the invention. In the figures.

DETAILED DESCRIPTION OF THE PREFERRED EMBODIMENT

Figure 1:
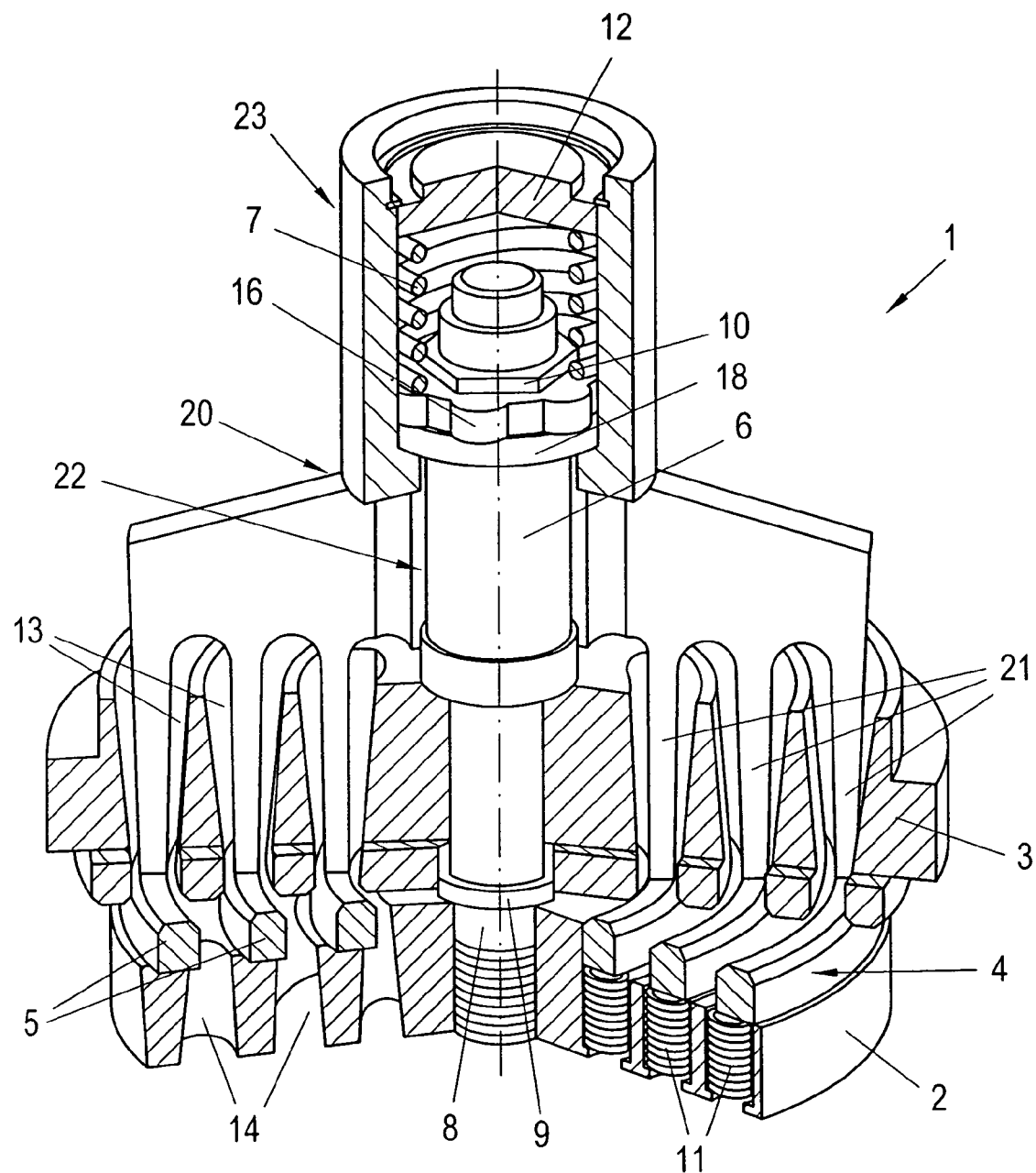
FIG. 1 shows a section through a suction valve according to the invention with an unloader.
Figure 2:
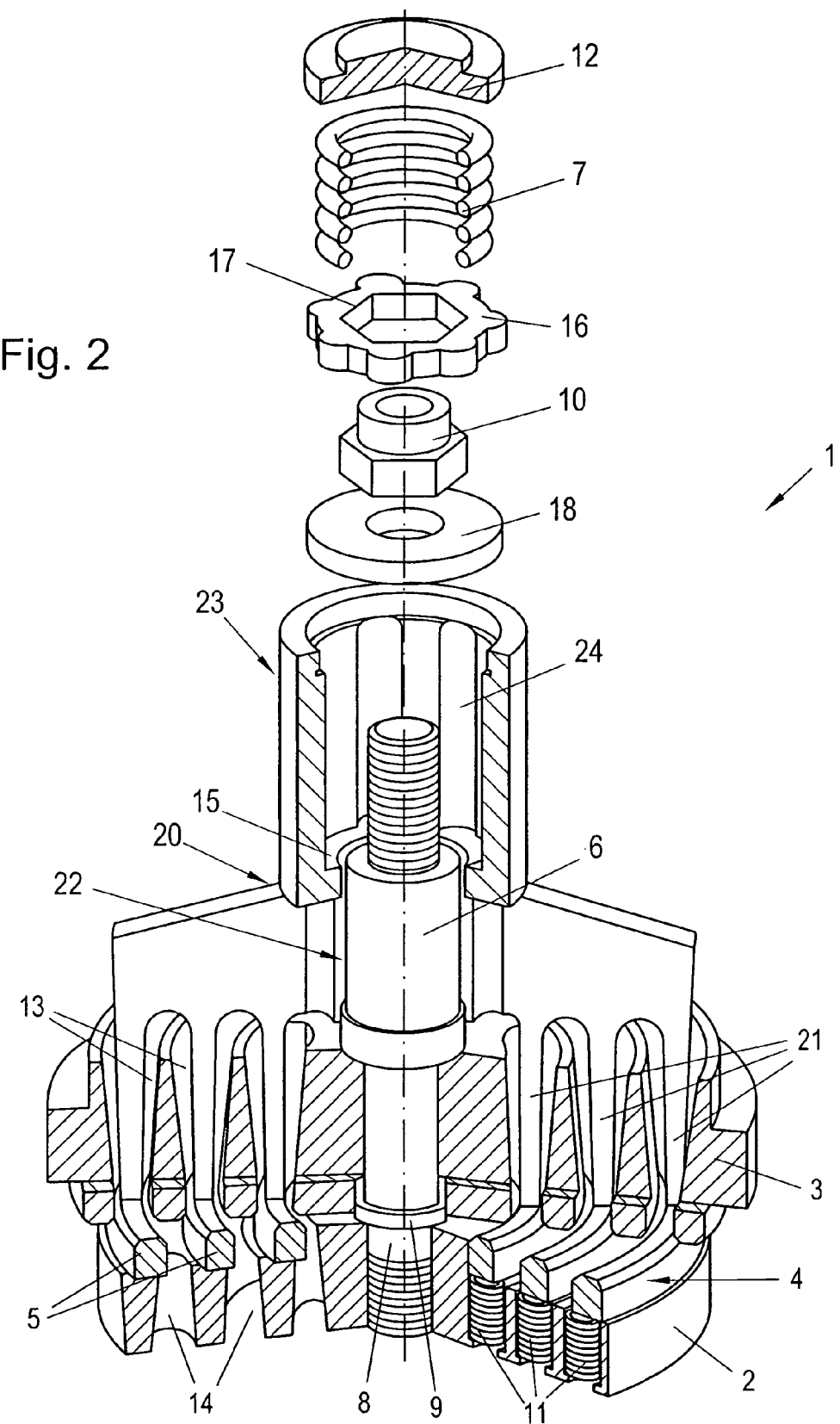
FIG. 2 shows an exploded illustration of this suction valve.

The basic structure of a suction valve 1 is well known, which is why it is only briefly discussed here with reference to FIGS. 1 and 2. A suction valve 1, e.g., for use in compressors, consists of a valve seat 3 and a valve guard 2. Therebetween, a valve element 4 is arranged which is moved back and forth between the valve seat 3 and the valve guard 2 and, in interaction with the valve seat 3, assumes the sealing function by closing and releasing the annular passage channels 13 in the valve seat 3. The individual parts of the suction valve 1 are held together by a through-bolt 8 which is screwed into the valve guard 2 and by an opposing valve nut 10. The distance between valve seat 3 and valve guard 2, and thus the possible valve stroke, is set by a spacer disk 9 arranged therebetween on the bolt 8. In addition, annular flow passages 14 are arranged in the valve guard 2.

At the bolt's 8 end facing away from the valve element 4, an unloader 20 is arranged, the unloader fingers 21 of which reach through the passage channels 13 of the valve seat 3 and rest against the valve element 4. The unloader 20 is slid with a guide section 22 onto a guide sleeve 6 which is arranged on the bolt 8 and thus is arranged axially displaceable. Said guide sleeve 6 also transfers the pre-load force of the bolt to the valve seat 3 so as to hold the suction valve 1 together. The unloader 20 is held by a valve nut 10 and a disk 18 which rests against a shoulder 15 arranged radially on the inside at the unloader 20. The valve nut 10 could also rest directly against the shoulder 15.

In the simplest case, the valve element 4 can be a well known valve plate or, as in the illustrated example, comprises concentrically arranged sealing rings 5 which interact sealingly with the valve seat 3. Associated and interacting sealing surfaces are in each case arranged at the sealing rings 5 and the valve seat 3. The sealing surfaces on the sealing rings 5 can be flat, for example (thus can lie in a normal plane of the suction valve 1); however, the sealing rings 5 can also have chamfered edges (see FIG. 1) serving as sealing surfaces, or the sealing rings 5 could also have toric sealing surfaces. Other sealing surfaces of any shape are principally also possible. The correspondingly associated sealing surfaces on the valve seat 3 are in any case correspondingly shaped to match each other.

The valve element 4 can also comprise a (non-illustrated) synchronizing plate which is arranged on the sealing rings' 5 sides facing away from the valve seat 3 and covers the sealing rings 5. Furthermore, between the synchronizing plate and the sealing rings 5, a (non-illustrated) metallic separating plate can be arranged which prevents the synchronizing plate and the sealing rings 5 from direct contact with each other and thus could wear each other down. The separating plate can be designed, e.g., as a thin flat metal disk, but it could also be shaped in any other way (corresponding to the shape of the synchronizing plate and/or the sealing rings 5), e.g. curved. Of course, a number of preferably annular (actually a number of sections of a circle which are separated by radial webs) flow openings are arranged in the synchronizing plate and in the separating plate so that the gaseous medium can pass through the suction valve 1 with as little loss as possible. In this case, the synchronizing plate, the separating plate and the sealing rings 5 together would form the valve element 4 of the suction valve 1 and would lie loosely against each other and would be mutually moved during the ring opening movement. Due to separation of synchronizing plate and sealing rings 5 by means of the separating plate, these parts can no longer wear each other down by the continuous movement of the valve element 4. Of course, the valve element 4 can also be designed in a different manner, e.g., without separating plate and/or synchronizing plate, or with a sealing plate instead of individual sealing rings 5, which is of minor importance for the present invention.

The valve element 4, here, the sealing rings 5, is spring-loaded by a number of spiral springs 11 arranged in spring nests on the valve guard 2. The spiral springs 11 thus push the sealing rings 5 against the valve seat 3. During the ring opening movement, the applied gas pressure lifts the sealing rings 5 off the valve seat 3 against the force of the spiral springs 11. However, instead of spiral springs 11, spring plates could be provided in a manner known per se, or the spring action can be carried out by resilient arms bent out of a synchronizing plate.

An anti-rotation lock is provided for the unloader so as to prevent the unloader 22 from rotating relative to the valve seat 3 since this could result in that the unloader fingers 21 abutting and rubbing against the radial webs between the passage channels 13, which can lead to increased wear and/or to damage to the unloader fingers 21 and/or to the valve seat 3. According to the invention, the anti-rotation lock consists of an anti-rotation locking disk 16 (see FIG. 3) which has a central recess 17 which has a diametrically opposed cross-section matched to the outer shape of the valve nut 10. The valve nut 10 usually is a hexagon nut so that in the simplest case, the cross-section of the recess 17 is also designed as a hexagon. Thus, the anti-rotation locking disk 16 can be slid with the central recess 17 onto the valve nut 10 and thus, due to the non-circular cross-sections, is arranged in a non-rotatable manner with respect to the valve seat 3 since in the assembled state, the valve nut 10 should not rotate. If necessary, the valve nut 10 can also be separately locked against rotation, e.g., by suitable locking rings.

However, a finer subdivision for the cross-section of the recess 17 is also possible, e.g., as a profile with twelve or eighteen edges, whereby the anti-rotation locking disk 16 can be slid with a finer angular partition, e.g. 30° or 20°, onto the valve nut 10. Thereby, a finer setting of the angular position of the unloader 20 is possible which makes assembling the suction valve 1 significantly easier because the unloader fingers 21 have to be arranged within a certain angular range (defined by the circumferential extension of the passage channels 13).

Figure 3:
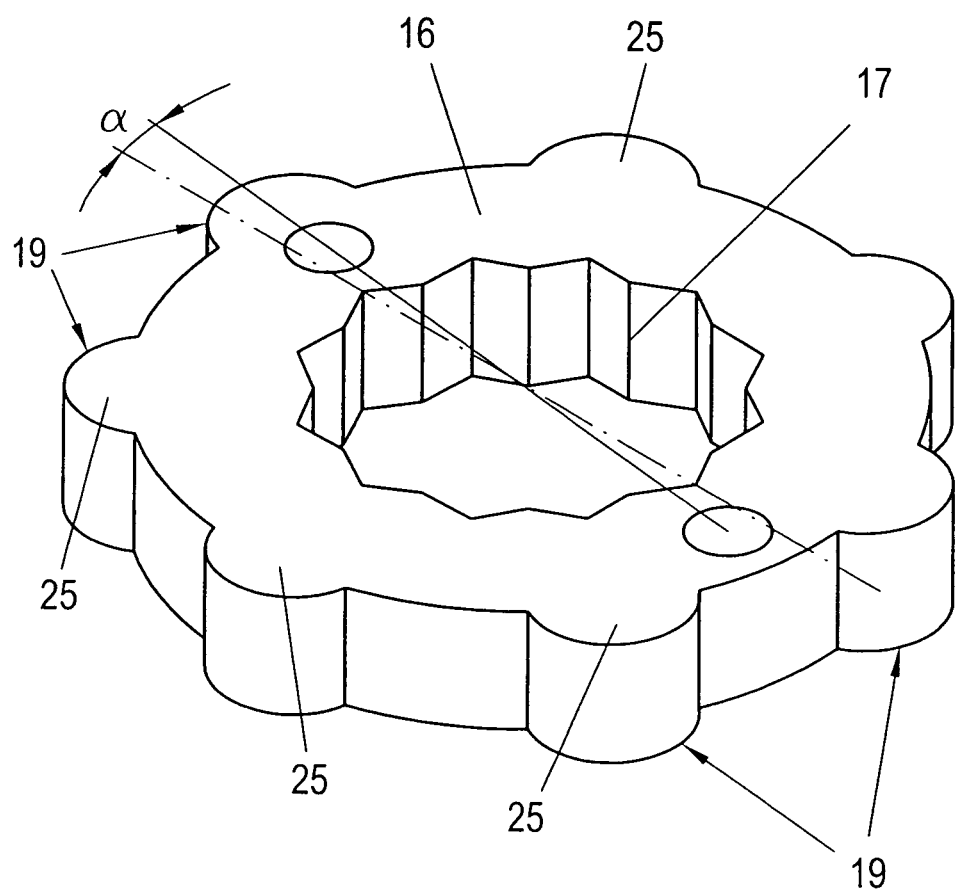
FIG. 3 shows an anti-rotation locking disk according to the invention.

The outer contour of the anti-rotation locking disk 16 has a non-circular cross-section and thus has a number of stop surfaces 19. Advantageously, a number of radially projecting protrusions 25 is provided on the outer circumference of the anti-rotation locking disk 16. Preferably, an odd number is selected for the number of stop surfaces 19 because in combination with an even-numbered partition of the recess 17, this results in a higher number of adjustment possibilities for the unloader 20. Likewise, it is advantageous to arrange the partition of the recess 17 and the partition of the stop surfaces 19 offset to each other by an angle α, e.g. 1°, as indicated in FIG. 3. This is achieved, e.g., in that a symmetry axis of the even-numbered partition of the recess 17 (e.g. a bi-hexagon) is offset relative to a symmetry axis of a protrusion 25 by an angle α. The angular offset of the other protrusions 25 is then defined corresponding to the number of protrusions 25. With such an arrangement, a setting range of 2-3° within a range of ±30° (for a recess 17 in the form of a bi-hexagon) can be achieved for the unloader 20, which is usually sufficient.

At an axial end of the unloader 20, preferably from the shoulder 15 to the axial end, an anti-rotation locking section is provided. The anti-rotation locking section 23 is provided with a central recess 24, the non-circular cross-section of which is shaped to match the outer contour of the anti-rotation locking disk 16. If the protrusions 25 of the anti-rotation locking disk 16 are designed as segments of a circle, the diametrically opposed matching non-circular cross-section of the recess 24 can be manufactured in a simple manner by drilling. The central recess 24 of the unloader 20 is slid onto the anti-rotation locking disk 16 so that the unloader 20 is arranged in a non-rotational manner with respect to the anti-rotation locking disk 16 which, for its part, is arranged in a non-rotational manner, and therefore, the unloader is also arranged in a non-rotational manner with respect to the valve seat 3.

The anti-rotation locking disk 16 preferably rests axially against the disk 18 and is axially pressed by means of a spring 7 against the disk. The disk 18 can also be eliminated. In this case, the anti-rotation locking disk 16 could rest against the shoulder 15 of the unloader 20. For this, a disk 12 can be provided at the opposing axial end of the anti-rotation locking section 23 of the unloader 20, wherein the disk is held in the unloader 20 by an indicated locking ring. However, instead of the disk 12, a different suitable stop for the spring 7 can be provided. Due to this arrangement, the unloader 20 can be moved in the axial direction against the spring force of the spring 7 toward the valve guard 2, whereby the valve element 4 is lifted off the valve seat 3 and the passage channels 13 are deblocked. Resetting the unloader 20 takes place automatically by the spring force of the spring 7.

Due to the fact that the anti-rotation locking disk 16 is spring-loaded and pressed against the disk 18, an additional anti-rotation lock for the valve nut 10 is achieved at the same time because thereby the anti-rotation locking disk 16 also prevents or counteracts loosening and unscrewing of the valve nut 10. Moreover, because of this, the anti-rotation locking mechanism in the valve does not have to be specifically fastened because this is done by the spring 7.

The non-circular cross-section of the outer contour of the anti-rotation locking disk 16 forms additionally a guide for the unloader 20 and for this purpose is advantageously made from a tribologically beneficial material such as a plastic or a plastic with certain fillers such as, e.g., PTFE, PEEK, PPS, PEK, POM, PA, HTCX, MTX or LTX. The use of plastic for the anti-rotation locking disk 16 allows also simple manufacturing, e.g., in the form of a continuous casting part which can be cut to the desired length.

Thus, an additional guide for the unloader 20 is created with the anti-rotation locking disk 16, whereby the unloader 20 is guided with its guide section 22 not only on the guide sleeve 6, but also with the anti-rotation locking section 23 on the anti-rotation locking disk 16. Thus, the guide of the unloader can be improved because due to the double guide, a reciprocating movement of the unloader 20 is prevented or at least reduced, whereby also the wear on the valve element 4 can be reduced. However, the guide section 22 could also be eliminated whereby in this case, guiding the unloading would be carried out only by the anti-rotation locking disk 16 in interaction with the anti-rotation locking section 23.

The invention claimed is:

1. A suction valve which comprises:
a valve seat having flow passages therethrough,
a valve guard having outlet passages therethrough,
a valve element movably positioned between said valve seat and said valve guard and capable of opening or closing the flow passages in the valve seat,
an unloader located on a side of said valve seat opposite said valve element, said unloader comprising a plurality of fingers which extend through some of said flow passages of said valve seat to contact said valve elements, said unloader having an internal wall defining an elongated central recess and which has a non-circular inner contour,
a central connecting bolt which has a first end attached to said valve guard and a second end located in said recess, and extending through said valve element and said valve seat,
a valve nut in said elongated central recess and mounted on said central connecting bolt, said valve nut having an outer contour with a non-circular cross section, and
an anti-rotation locking disk in said elongated central recess and mounted around said valve nut, said anti-rotation locking disk having an inner recess with a non-circular cross section that mates with said non-circular cross section of said outer contour of said valve nut so as to be non-rotational relative thereto, and an outer contour which mates with said non-circular inner contour of said wall of said unloader which defines said elongated central recess so as to be non-rotational with respect thereto, said unloader being axially movable relative to said central connecting bolt but non-rotatable with respect thereto.

2. The suction valve according to claim 1, wherein the central connecting bolt includes a guide sleeve and said unloader includes a section, said section being axially guided on said guide sleeve.

3. The suction valve according to claim 1, wherein the outer contour of said anti-rotation locking disk includes a plurality of spaced radially-projecting protrusions around a periphery thereof.

4. The suction valve according to claim 3, wherein a partition of the elongated central recess resulting from the non-circular cross-section and a partition of the protrusions resulting from the plurality of protrusions are offset to each other by an angle ($\alpha$).

5. The suction valve according to claim 1, including spring means between the valve guard and the valve element to bias said valve element towards said valve seat.

6. The suction valve according to claim 1, including a spring in the unloader, said spring resting with one end against the anti-rotation locking disk and with an opposite second end against means forming a limit stop in the elongated central recess.

* * * * *